US008166142B2

(12) United States Patent
Rudkin

(10) Patent No.: US 8,166,142 B2
(45) Date of Patent: Apr. 24, 2012

(54) INTER-DOMAIN CONGESTION CHARGING

(75) Inventor: Steven Rudkin, Ipswich (GB)

(73) Assignee: British Telecommunications PLC, London (GB)

( * ) Notice: Subject to any disclaimer, the term of this patent is extended or adjusted under 35 U.S.C. 154(b) by 685 days.

(21) Appl. No.: 10/571,483

(22) PCT Filed: Sep. 13, 2004

(86) PCT No.: PCT/GB2004/003916
§ 371 (c)(1),
(2), (4) Date: Mar. 14, 2006

(87) PCT Pub. No.: WO2005/027436
PCT Pub. Date: Mar. 24, 2005

(65) Prior Publication Data
US 2007/0028003 A1    Feb. 1, 2007

(30) Foreign Application Priority Data

Sep. 15, 2003  (GB) .................................. 0321570.4

(51) Int. Cl.
*G06F 15/173*  (2006.01)
*G06F 15/16*  (2006.01)
(52) U.S. Cl. ........................................ 709/223; 709/235
(58) Field of Classification Search .................. 709/235, 709/223
See application file for complete search history.

(56) References Cited

U.S. PATENT DOCUMENTS

| 5,751,969 | A | 5/1998 | Kapoor | |
| 2002/0156910 | A1* | 10/2002 | Senda | 709/232 |
| 2003/0012138 | A1* | 1/2003 | Abdelilah et al. | 370/231 |
| 2003/0097461 | A1 | 5/2003 | Barham et al. | |
| 2003/0154174 | A1* | 8/2003 | Tassel et al. | 705/412 |
| 2005/0286488 | A1* | 12/2005 | Briscoe et al. | 370/351 |

FOREIGN PATENT DOCUMENTS

| EP | 1 045 546 | 10/2000 |
| EP | 1045546 A2 | 10/2000 |
| EP | 1317151 A1 | 6/2003 |
| GB | 2281005 A | 2/1995 |

OTHER PUBLICATIONS

International Search Report dated Jan. 7, 2005.

(Continued)

*Primary Examiner* — Alina N Boutah
*Assistant Examiner* — Clarence John
(74) *Attorney, Agent, or Firm* — Nixon & Vanderhye PC

(57) ABSTRACT

A method and system to allow congestion charging signals to be generated and congestion charges to be applied on an inter-domain basis, on an aggregated basis and not on a per flow basis. Each network domain charges its neighboring domain for any ECN marks that it forwards to them. Since a flow will collect marks as it progresses across the network the last network domain (typically an Internet service provider (ISP) located at the edge of the network domains) will levy a charge based on a higher number of marks than any of the charges levied by other domains involved in the transmission of the flow, and this higher charge can be passed on to the end user, preferably as a single aggregated charge per subscriber per accounting period. Each network domain (whether an edge ISP or other domain such as an intermediate ISP) will forward traffic to other network domains and consequently can produce a single aggregated charge per connected domain.

28 Claims, 6 Drawing Sheets

OTHER PUBLICATIONS

UK Search Report dated Nov. 20, 2003.

Henderson et al., "Congestion Pricing: Paying Your Way in Communication Networks", Sep./Oct. 2001, IEEE Internet Computing, pp. 85 to 89.

John Murphy, et al., "Distributed Pricing for Embedded ATM Networks," Proc. 14$^{th}$ International Teletraffic Congress (ITC '94), pp. 1053-1063 (Jun. 1994) [see http://elm.eeng.dcu.ie/~murphyj/publ/c4.pdf].

R. J, Gibbens, et al., "Resource pricing and the evolution of congestion control," Automatica 35(12):1969-1985 (Dec. 1999) [see http://www.statslabcam.ac.uk/~frank/evol.html].

* cited by examiner

INTER-DOMAIN CONGESTION CHARGING

This application is the US national phase of international application PCT/GB2004/003916 filed 13 Sep. 2004 which designated the U.S. and claims benefit of GB 0321570.4, dated 15 Sep. 2003, the entire content of which is hereby incorporated by reference.

TECHNICAL FIELD

The present invention relates to a method of operating a network to permit inter-domain congestion charging, and to related apparatus arranged to perform the method.

BACKGROUND TO THE INVENTION AND PRIOR ART

Explicit Congestion Notification (ECN) has been proposed for use within Internet Protocol (IP) networks, and involves ECN capable routers marking packets as having experienced congestion by the use of specific ECN fields within the packet header, rather than dropping the packet and leaving the receiver to infer congestion, as had previously been the case (as packet loss could also be caused by transmission errors, loss of a packet is no definitive indicator of network congestion). Within IP, a two-bit field within the IP header has been proposed to enable the marking of packets, comprising a first 'ECN-Capable Transport' (ECT) bit (which was generally intended to be used to indicate whether the end-points of the transport protocol were ECN capable) and a second 'Congestion Experienced' (CE) bit (which was generally intended to be marked by routers in the event of congestion to indicate that the packets has experiences congestion). The use of two bits within the IP header provides four code-points, however, ([ECT,CE]: [0,0], [0,1], [1,0], and [1,1]) and RFC 3168 (see FIG. 1 thereof) defines two of these as being indicative of ECN capability ([0,1] and [1,0], referred to as ECT(1) and ECT(0) respectively), leaving the code-point [0,0] to indicate a lack of ECN capability, and the code-point [1,1] to indicate a 'Congestion Experienced' state. Senders are free to use either the ECT(0) or the ECT(1) code-point to indicate ECT, on a packet-by-packet basis. The use of both the two code-points for ECT, ECT(0) and ECT(1), is motivated primarily by the desire to allow mechanisms for the data sender to verify that network elements are not erasing the CE codepoint, and that data receivers are properly reporting to the sender the receipt of packets with the CE codepoint set, as required by the transport protocol.

Regarding uses of the ECN marks, Henderson et al. in *Congestion Pricing: Paying Your Way in Communication Networks*, IEEE Internet Computing, September/October 2001 pp. 77-81 proposed their use for both congestion signalling purposes and for congestion pricing. In particular, Henderson et al suggest that since the mark indicates network congestion, the network can aggregate marks to represent a "shadow price" for a flow, reflecting the cost of the congestion which it causes. Such an approach indicates a "per flow" charging policy, however, which may not be practicable, and especially between different network domains which a flow may encounter between the sender and receiver, due to the potentially high number of individual flows which might pass between two network domains. Additionally, there is an added problem using ECN marks to generate the shadow price that it is not until the packets of a flow have arrived at the receiver that the number of packets in the flow with the CE code-point set can be properly measured, as at any point on the route before this further packets may have the CE code-point set at any router later in the route. There is therefore a further problem of generating the level of shadow charges for use on an inter-domain basis between network domains without having knowledge of the total shadow charge which will ultimately arise.

Referring now to prior art patent documents, European patent application EP 1,317,151 relates to a method for congestion control signalling for use in a wireless network, and includes a brief review of the uses of ECN marks for congestion control signalling.

U.S. Pat. No. 5,751,969 relates to apparatus and methods for predicting and managing congestion in networks.

UK patent application GB 2,281,005 to a manner of self-regulating traffic to avoid congestion in an Asynchronous Transfer Mode (ATM) network.

United States patent application US 2003/0097461 relates to systems and methods for controlling network demand via congestion pricing, and includes a discussion of ECN-based schemes.

SUMMARY OF THE INVENTION

The present invention alleviates the above problems by the provision of a method and system to allow congestion charging signals to be generated and congestion charges to be applied on an inter-domain basis, on an aggregated basis and not on a per flow basis. Each network domain charges its neighbouring domain for any ECN marks that it forwards to them. Since a flow will collect marks as it progresses across the network the last network domain (typically an Internet service provider (ISP) located at the edge of the network domains) will levy a charge based on a higher number of marks than any of the charges levied by other domains involved in the transmission of the flow, and this higher charge can be passed on to the end user, preferably as a single aggregated charge per subscriber per accounting period. Each network domain (whether an edge ISP or other domain such as an intermediate ISP) will forward traffic to other network domains and consequently can produce a single aggregated charge per connected domain.

In view of the above, from a first aspect the present invention provides a method of operating a data packet network, wherein at least some of the data packets transported by the network contain control data indicative of whether the packet has experienced congestion, the method comprising the steps of:— a) routing data packets from the network towards one or more data receiving entities;

b) counting the number of data packets routed towards the or each respective data packet receiving entity which contain control data indicating that the packet has experienced congestion; and c) generating one or more respective congestion charge signals indicating the respective congestion charges to be levied on the data packet receiving entities for transport of the data packets routed thereto in dependence on the respective count for the or each data packet receiving entity obtained from step b).

The invention of the first aspect therefore facilitates scalable inter-domain congestion charging by simply counting the number of packets which have the CE code-point set within the ECN bits which are passed to each data receiving entity, irrespective of the individual data flow to which each packet belongs, and generating the congestion charge signal in dependence on the count. Moreover, the data receiving entities may be an ingress router of a subsequent network domain or an actual end-user receiver connected via an ISP domain, and the operation of the invention within each such network domain through which data packets pass between the transmitter and the receiver allows the congestion charges accumulated by the data packets along the route to ripple along the network from the transmitter's ISP domain through each subsequent network domain and then ultimately to be passed onwards to the receiver.

In an embodiment of the invention, the generating step further comprises applying a tariff function to the or each respective count to produce the congestion charge signals. By applying a tariff function then the final congestion charge signal generated may take into account external factors, such as time of day, or the like. In such embodiments it is further possible for different tariff functions to be applied to at least some of the respective counts such that different congestion charges are levied pro rata on at least some of the data packet receiving entities. This further increases the charging structure flexibility within the same technological framework of the invention.

Within the preferred embodiments, the further steps of receiving data packets from one or more data transmitting entities, at least some of the received data packets containing control data indicating that the packet has experienced congestion; and receiving respective congestion charge signals from the or each data transmitting entities indicating the respective congestion charges to be levied for receiving the received data packets therefrom are performed. This feature allows the charges to ripple towards the receiver, thus providing ready scalability of ECN charging.

In the preferred embodiments, the counting step is preferably performed for the or each data receiving entity over a respective aggregation period, and the generating step further acts to generate the respective congestion charge signal for a particular data receiving entity once per aggregation period. This allows for aggregate charging irrespective of individual data flows to be performed, which further simplifies the congestion charging scheme.

From a second aspect, the present invention further provides a method of operating a data packet network, wherein at least some of the data packets transported by the network contain control data indicative of whether the packet has experienced congestion, the method comprising the steps of:— a) routing data packets from the network towards one or more data receiving entities;

b) counting the number of data packets routed towards the or each respective data packet receiving entity which contain control data indicating that the packet has experienced congestion;

c) generating one or more count signals indicating the respective count for the or each data packet receiving entity obtained from step b); and d) transmitting the one or more count signals to a billing server.

From a third aspect the invention also provides a method of operating a billing server, comprising the steps of:— a) receiving one or more count signals, the or each count signal indicating a respective count of the number of data packets routed to respective one or more data packet receiving entities by a data packet network which contain control data indicating that the packet has experienced congestion; and b) generating one or more congestion charge signals indicating respective congestion charges to be levied on the data packet receiving entities in dependence on the received respective count signals.

The methods of the second and third aspects provide the same advantages as previously described in respect of the first aspect, but with the additional advantage that the billing server can be operated separately from the network. In some implementations this may provide for economies of scale, as a single billing server may service each network domain's egress routers.

Within the third aspect similar further features and advantages as previously described in respect of the first aspect are also obtainable.

From a fourth aspect the invention further provides a data packet network, for transporting data packets containing control data indicative of whether the packet has experienced congestion, the network comprising:— i) at least one router, arranged in use to:—
a) route data packets from the network towards one or more data receiving entities; and
b) count the number of data packets routed towards the or each respective data packet receiving entity which contain control data indicating that the packet has experienced congestion; and ii) congestion charging means arranged in use to generate one or more respective congestion charge signals indicating the respective congestion charges to be levied on the data packet receiving entities for transport of the data packets routed thereto in dependence on the respective count for the or each data packet receiving entity obtained by the or each router.

The invention of the fourth aspect provides the same advantages, and the same further features and advantages, as previously described in respect of the first aspect.

From a fifth aspect there is further provided a router for use in a data packet network, wherein at least some of the data packets transported by the network contain control data indicative of whether the packet has experienced congestion, the router comprising:— a) means for routing data packets from the network towards one or more data receiving entities;

b) counting means for counting the number of data packets routed towards the or each respective data packet receiving entity which contain control data indicating that the packet has experienced congestion;

c) signalling means arranged to generate one or more count signals indicating the respective count for the or each data packet receiving entity obtained from the counting means; and d) means for transmitting the one or more count signals to a billing server.

Additionally, from a sixth aspect the invention also provides a billing server, comprising:— a) means for receiving one or more count signals, the or each count signal indicating a respective count of the number of data packets routed to respective one or more data packet receiving entities by a data packet network which contain control data indicating that the packet has experienced congestion; and b) congestion charge means for generating one or more congestion charge signals indicating respective congestion charges to be levied on the data packet receiving entities in dependence on the received respective count signals.

Additionally from a seventh aspect the present invention also provides a computer program or suite of programs arranged such that when executed on a computer system the program or suite of programs causes the computer system to perform the method of any of the first, second or thirds aspects. Moreover, from a further aspect there is also provided a computer readable storage medium storing a computer program or suite of programs according to the seventh aspect. The computer readable storage medium may be any suitable data storage device or medium known in the art, such as, as a non-limiting example, any of a magnetic disk, DVD, solid state memory, optical disc, magneto-optical disc, or the like.

BRIEF DESCRIPTION OF THE DRAWINGS

Further features and advantages of the invention will become apparent from the following description of embodiments thereof, presented by way of example only, and with reference to the accompanying drawings, wherein like reference numerals refer to like parts, and wherein:—

DESCRIPTION OF THE EMBODIMENTS

Figure 1:
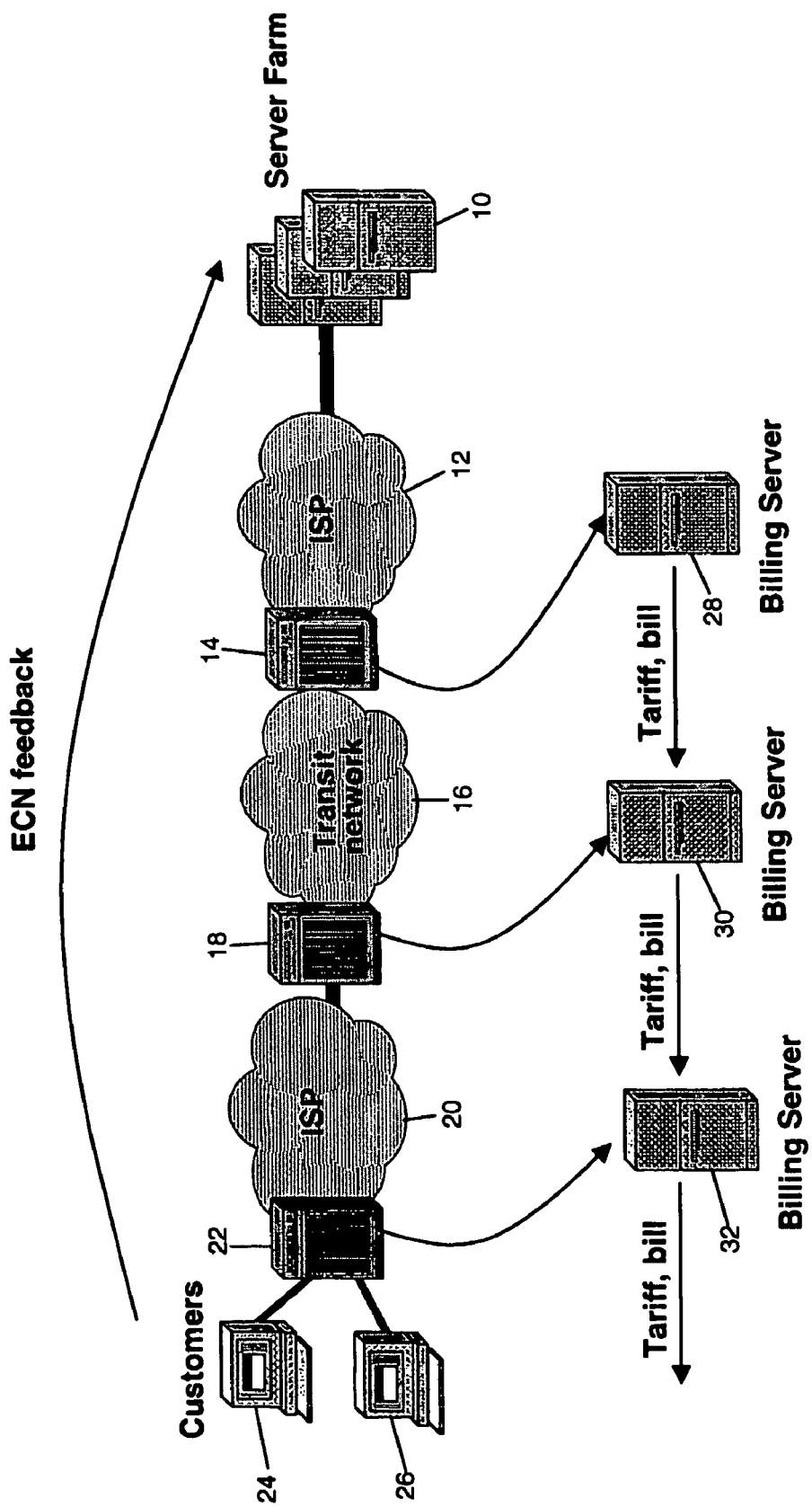
FIG. 1 is a stylised diagram illustrating the operation of an embodiment of the present invention in one direction.
Figure 2:
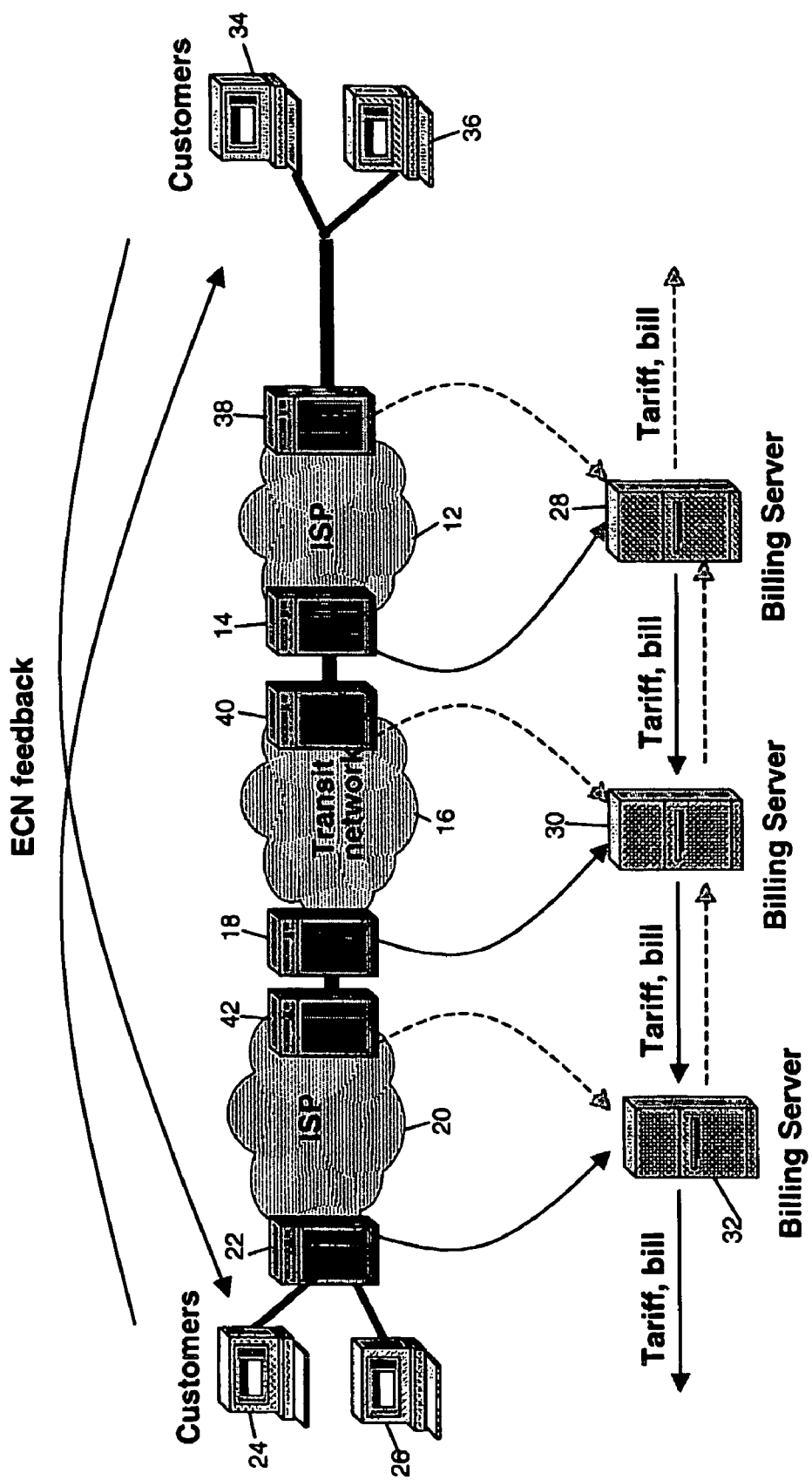
FIG. 2 is a stylised diagram illustrating the operation of embodiments of the present invention in two directions.

FIGS. 1 and 2 are stylised diagrams which provide an overview of the operation of the embodiments of the invention. FIG. 2 differs from FIG. 1 in that it illustrates the situation where traffic is being sent in both directions over the various networks, whereas FIG. 1 illustrates the simpler situation where traffic is being sent in one direction.

With reference to FIG. 1, the operating environment of the embodiments of the invention where traffic is being sent in a single direction comprises a server farm 10 which constitutes the source of the traffic, a first ISP network domain 12 provided with an egress route 14, a transit network domain 16 connected with an egress router 14 of the first ISP network domain 12, and a second egress router 18 provided as part of the transit network 16. A second ISP network domain 20 is connected by the egress router 18 of the transit network 16, and is further provided with its own egress router 22 which connects the second ISP network domain 20 with end user customers 24 and 26. Additionally provided is a first billing server 28 arranged to receive signals from the egress router 14 of the first ISP network domain 12, a second billing server 30 arranged to receive signals from the egress router of the transit network 16, and a third billing server 32 arranged to receive signals from the egress router 22 of the second ISP network domain 20.

Within the operating environment thus described, each of the network elements within the first ISP network domain 12, the transit network 16, and the second ISP network domain 20 are ECN capable; that is, when transporting internet protocol packets each network element (such as routers or the like) sets the ECT (0) or ECT (1) codepoint in the ECN bits of the IP header, to indicate that each network is ECN capable. Being ECN capable, each relevant network element within each of the network domains 12, 16, and 20 then acts to mark IP packets with the "congestion experienced" codepoint in the event that any of those packets experience congestion. It will be appreciated that once a packet has been marked with the CE codepoint then it should not be unmarked as such, such that as traffic proceeds through the network domains from the server farm 10 to the customers 24 and 26, each traffic flow will collect an increasing number of packets which have the CE codepoint set.

The present invention is, however, concerned with charging aspects of ECN marking, between the individual network domains, and between network domains and the final customer, based on the ECN marks. In order to explain this further, an example operation of the system of FIG. 1 is described next.

In this example, imagine that the server farm 10 is supplying data via the ISP 12, transit network 16, and ISP 20 to each of the customers 24 and 26, for example in response to a request therefor. For the sake of discussion, let us assume in this example that the server farm 10 runs a video on demand application, and that each of the customers 24 and 26 are receiving both video and audio data streams respectively from the server farm 10 via the network domains. There are thus four individual traffic flows flowing from the server file 10 to the network domains 12, 16, and 20, being one video flow and one audio flow per customer.

Considering each of these flows, they first pass from the server farm 10 into the first ISP network domain 12. At each router within the ISP network domain 12 individual packets of each flow may encounter congestion, but instead of the router then dropping such packets it instead marks the "CE" codepoint of each packet to indicate that the packet has experienced congestion. The packet is then routed onwards in accordance with its routing information in the usual manner. This behaviour is applied by each router within the ISP network domain 12 to each packet in each flow, such that every packet which experiences congestion has its CE codepoint set.

Within this example, the route which each flow takes leads from the first ISP network domain 12 via the egress router thereof to the transit network 16. Thus, each flow passes through the egress router 14 and is then routed to an ingress router of the transit network 16. It is within the egress router 14, however, that the opportunity arises to account for the number of packets which have had their CE codepoint set within the first ISP network domain 12, and thus as the egress router 14 route packets towards the transit network 16, it maintains a count of the number of packets which have had the CE codepoint set. It should be noted that this count is a cumulative count of all the packets which are passed from the egress router 14 to the transit network 16 which have the CE codepoint set, regardless of any particular traffic flow to which a packet belongs. Therefore, the egress router 14 maintains a cumulative account over an aggregated time period of any congestion marked packet passed to the transit network 16, such that this cumulative count can then form the basis of a billing relationship between the first ISP network domain 12, and the transit network 16.

In order to permit billing of the transit network 16, the egress router 14 periodically sends count information to a billing server 28 associated with the first ISP network domain 12. The billing server 28 receives the count information, and then applies an appropriate tariff function to the count so as to generate a congestion charge signal indicating a congestion charge to be levied by the first ISP network domain 12 on the transit network 16 for the transport of all congestion marked packets thereto within the present aggregation billing period.

Within the transit network 16, the packets received from the ISP network domain 12 are routed onwards through the transit network 16, and any packets which experience congestion at any routers within the transit network 16 have the CE codepoint set as appropriate. In the present example the traffic flows destined for the customers 24 and 26 are routed to the egress router 18, which, in a similar manner to the egress router 14, routes packet arriving thereat to the second ISP network domain 20, whilst at the same time maintaining a count of the number of packets routed to the second ISP network domain which have had the CE codepoint set. The count is maintained over an aggregation period, and at the end of the aggregation period the count information is sent to a billing server 30 associated with the transit network 16, which applies a tariff function to the count to generate a congestion charging signal relating to a congestion charge to be levied upon the second ISP network domain 20. It will be appreciated that the count of "CE" packets at the egress router 18 of the transit network 16 will be higher than that at the egress router 14 of the first ISP network domain 12, for the reason that packets arriving at the egress router 18 may have had the CE codepoint set in either of the first ISP domain 12, or within the transit network 16.

The packets destined for the customers 24 and 26 output from the egress router 18 of the transit network 16 are passed to an ingress router within the second ISP network domain 20, and from there are transported across the ISP network domain 20 to an egress router 22 thereof. It will be appreciated that as the ISP network domain 20 is ECN capable then whenever a packet experiences congestion within the ISP network domain 20 it will have its CE codepoint set. At the egress router 22 of the second ISP network domain 20 the respective packet flows destined for the customers 24 and 26 are respectively routed thereto, which in the present example means that each of an audio stream and a video stream is routed to each of the customers 24 and 26. The egress router 22 keeps a respective count of the number of packets routed to each customer 24 or 26 which have had the CE codepoint set. These respective counts are cumulative counts of the number of packets with the CE codepoint set present in all of the flows routed to any particular respective customer. The respective counts are accumulated over a respective aggregation period for each customer (which may or may not be the same for each customer), and at the end of each aggregation period the count information is transmitted to a billing server 32 associated with the second ISP network domain 20 for use in generating a bill to be sent to each customer 24 and 26. As with the billing servers 28 and 30, the billing server 32 operates by applying a tariff function to the respective count, to generate a congestion charge to be levied upon each customer.

As an aside, during the transmission period of any particular traffic flow from the server farm 10 to each customer, the customers 24 and 26 may use the received congestion marks as part of a control algorithm, for example a rate control algorithm. Therefore, each of the customers 24 and 26 may send feedback regarding the number of packets which they are receiving with the CE codepoint set to the server farm 10, for use in such a control loop.

It will be appreciated from the above that charges for the transport of CE packets ripple from the sender through the network domains to the receivers, and that where an identical pro-rata charge is made between network domains, then the charge between two domains increases the closer to the end user the domain lies. That is, in this example, if the tariff function applied to the respective counts within each of the billing servers 28, 30, and 32 is identical, then the first ISP network domain 12 will levy a smaller charge on the transit network 16 than the transit network 16 levies on the second ISP network domain 20. Similarly, the final charge levied by the second ISP network domain 20 on the customers 24 and 26 will be larger than that levied by the transit network 16 on the second ISP network domain. In this manner the charges can ripple along the network, with end user customers being finally liable for the largest charge of all.

It should be noted, however, that the above scenario assumes that each of the billing servers applies a respective tariff function which levies an identical pro-rata charge per CE codepoint, but this need not necessarily be the case, and different tariff functions may be applied between different neighbouring domains. It should also be appreciated that the aggregation period over which a count of the CE codepoints transmitted between any two neighbouring network domains is performed may be different. Because the counts are accumulated irrespective of individual traffic flows, the aggregation period may be quite long, and may be measured in any of seconds, minutes, hours, days, weeks, or months.

FIG. 1 as described has dealt with the situation of traffic flowing in one direction from the server farm 10 towards the customers 24 and 26. In reality, of course, traffic will usually flow in both directions over networks, and this situation is shown in FIG. 2. Here, traffic is flowing between either of the customers 24 and/or 26 to either of the customers 34 and/or 36, and vice versa.

To accommodate two way traffic, each of the network domains, 12, 16, and 20 is provided with additional egress routers 38, 40, and 42 respectively to allow for traffic being output from each network domain in the opposite direction. Each of the egress routers 38, 40, and 42 operates identically to those egress routers 14, 18, and 22 as previously described, in that they maintain a cumulative count of the number of packets passed to the data receiving entity to which they are connected (whether this be network domain, or a customer) over an aggregation period, and at the end of each aggregation period send the count information to a respective billing server for the generation of a congestion charge signal. Apart from these differences, however, the operation of the two way traffic is substantially identical to that of one way traffic as previously described in respect to FIG. 1.

From the above description, it will be seen that the operation of the embodiments of the present invention relies upon the egress routers 22, 24, 18, 40, 14, and 38 counting the CE codepoint packets over the appropriate aggregation period, and subsequently transmitting the count information to the billing server for generation of the congestion charge. In view of this, the architecture and operation of an egress router and of a billing server as used within the present invention will be described in detail next.

Figure 3:
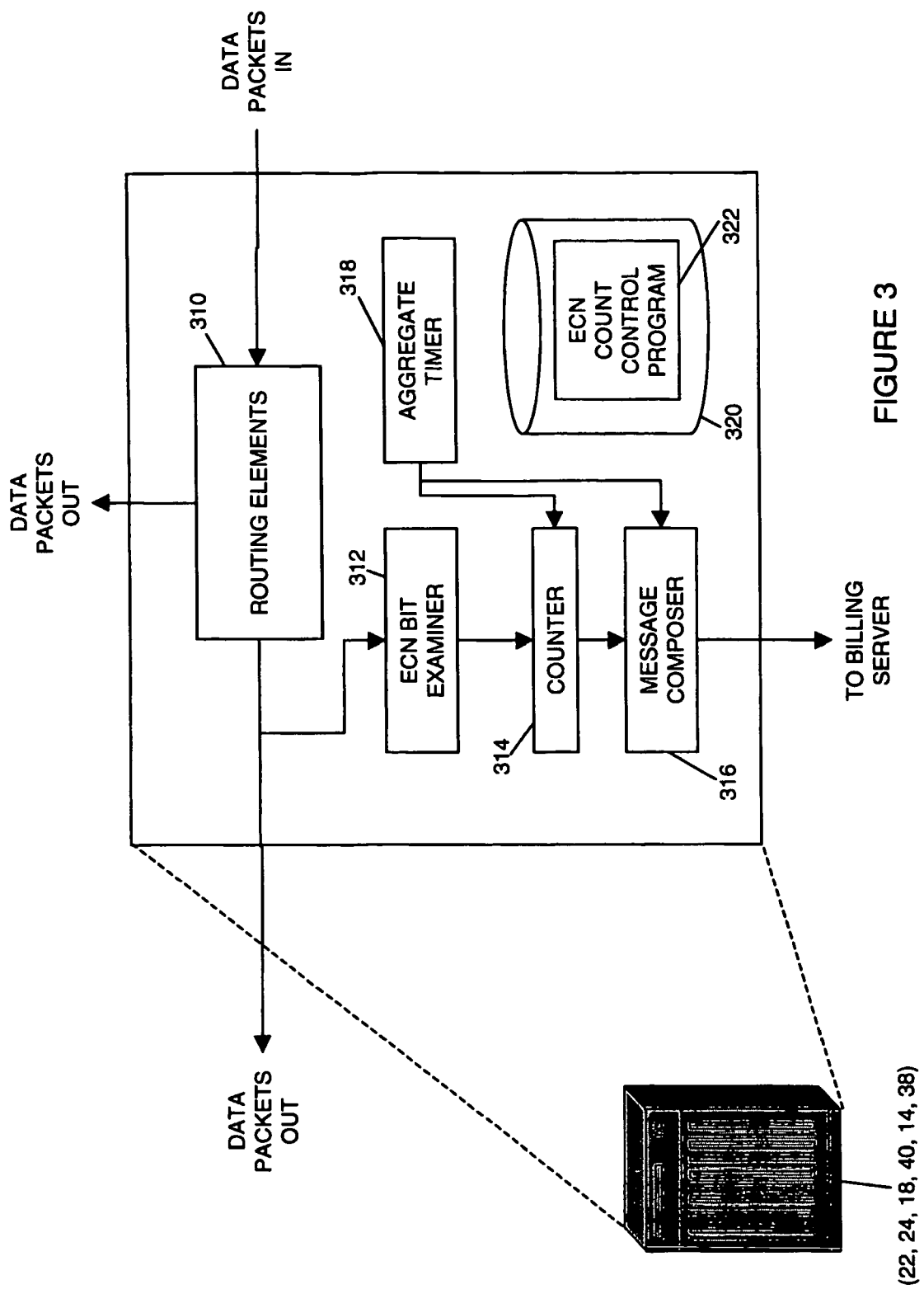
FIG. 3 is a system block diagram of an egress router used in the embodiments of the invention as shown in FIGS. 1 and 2.

FIG. 3 is a system block diagram illustrating an example internal architecture of the egress routers 22, 24, 18, 40, 14, or 38. More particularly, an egress router according to the embodiments of the invention comprises conventional routing elements 310, which are arranged to receive data packets in and to route the data packets out via two or more output ports. According to the embodiments of the invention, there is then added an ECN bit examiner 312 which is arranged to examine packets routed out of one of the output ports of the router, to determine whether each packet has the CE codepoint set. Additionally provided is a counter 314 arranged to receive an increment signal from the ECN bit examiner 312, and to increment a cumulative count upon the receipt of such signal. An aggregate timer 318 times a count aggregation period, and outputs an enable signal to the counter 314 indicating to the counter that it should output its count value, and reset the count. The count value is output from the counter 314 to a message composer 316 which transmits the packet count data to a billing server. The message composer 316 operates under the control of a control signal from the aggregate timer 318. It should be noted that each of the ECN bit examiner 312, counter 314, message composer 316, and aggregate timer 318 may be implemented in software, and hence the router is also provided with a non-transitory program storage medium 320, such as a hard disk, computer memory, or the like, upon which is stored an ECN count control program 322, which can implement each of the aforementioned components, and control their respective operations thereof when executed by a suitable processor.

The operation of each of the components of FIG. 3 will be described in more detail with respect to FIGS. 4, 5, 6, and 7.

Figure 4:
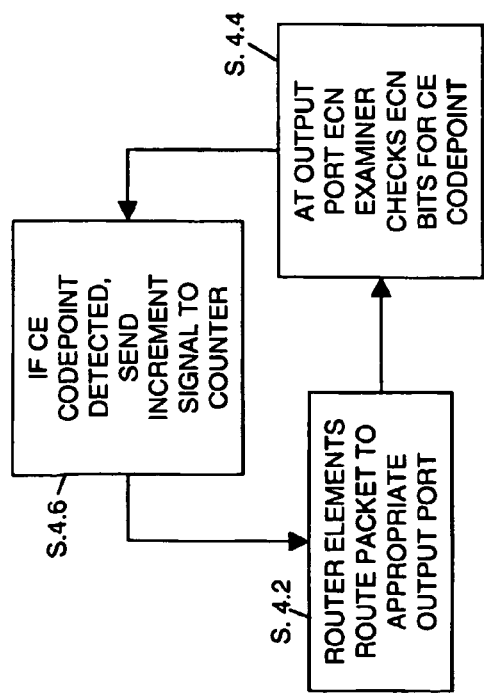
FIG. 4 is a flow diagram illustrating the operation of some elements of the router of FIG. 3.

FIG. 4 illustrates the steps performed by the conventional routing elements 310, and the ECN bit examiner unit 312. More particularly, at step 4.2 the conventional routing elements 310 act to route packets in accordance with information contained in the packet headers to the appropriate output port of the router. At an output port, at step 4.4 an ECN examiner unit checks the ECN bits of each packet routed to the port for the CE codepoint. It will be recalled from the discussion in the introduction of this specification that the CE codepoint is [(ECT,CE):(1,1)], and hence the ECN bit examiner unit 312 can conveniently check for the CE codepoint by performing a logical AND of the two ECN bits within the header. If the ECN bit examiner unit 312 detects that a packet has the CE codepoint set, then it sends an increment signal on its output to the counter 314, at step 4.6. The flow diagram at FIG. 4 is illustrated as being a loop, because the operations of the routing elements 310, and the ECN bit examiner 312 continue indefinitely, while packets are being routed to the output ports of the router.

Figure 6:
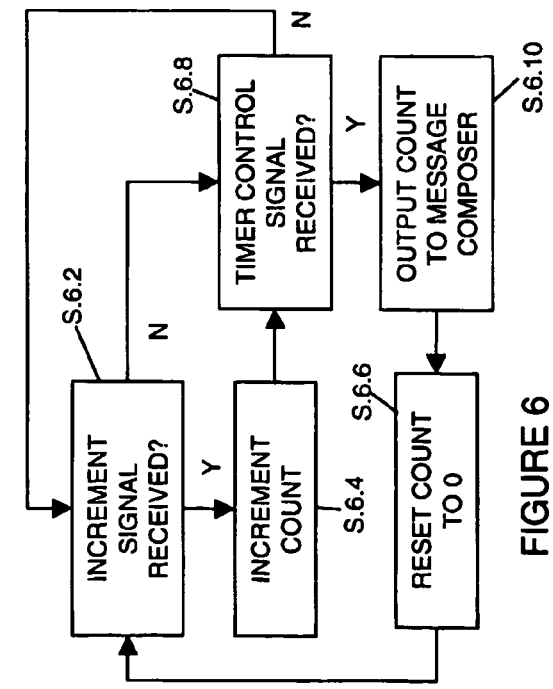
FIG. 6 is a flow diagram illustrating the operation of the counter used in the router of FIG. 3.

FIG. 6 illustrates the operations of the counter unit 314. Firstly, at step 6.2 the state of the counter unit is that it is listening on an input for an increment signal from the ECN bit examiner unit. If an increment signal is received at step 6.2 then the counter proceeds to step 6.4, wherein the cumulative count is incremented by 1. Once the count has been incremented processing proceeds to step 6.8. Similarly, when in the wait state of step 6.2, if an increment signal is not received after a short predetermined wait period, then processing also proceeds to step 6.8.

Step 6.8 is a further wait state wherein the counter checks as to whether or not a timer control signal has been received from the aggregate timer 318. If a timer control signal has not been received after a short predetermined wait period then processing loops back to step 6.2 wherein a check is made as to whether or not an increment signal is received from the ECN bit examiner unit 312. Thus, with this arrangement, it will be seen that the counter unit 314 alternately checks its inputs to determine whether or not an increment signal has been received, or a timer control signal has been received, such that such a signals can be detected as soon as they are sent from the sending units.

If, at step 6.8 it is determined that the timer control signal has been received by the counter 314, then the counter acts to output data corresponding to its present count value to the message composer 316, at step 6.10. The count is then reset to zero at step 6.6, whereupon the counter returns to the increment signal checking step at step 6.2. Thus, in accordance with FIG. 6, the counter increments its count whenever it receives an increment signal from the ECN bit examiner, and outputs the accumulated count, followed by a reset of the count whenever it receives a timer control signal from the aggregate timer 318.

Figure 5:
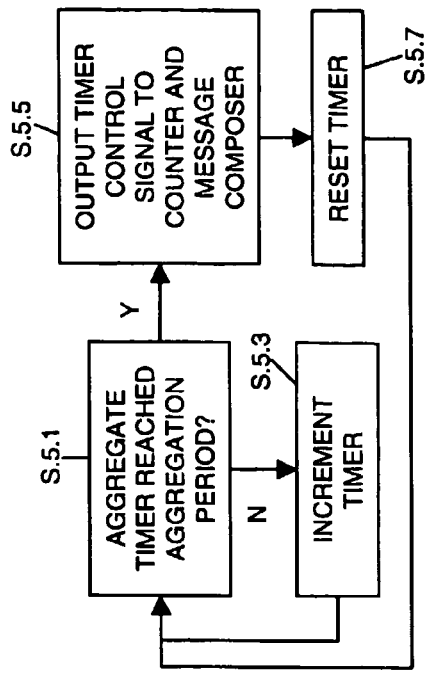
FIG. 5 is a flow diagram illustrating the operation of the aggregate timer used in the router of FIG. 3.

FIG. 5 illustrates the process flow at the aggregate timer 318. Firstly, at step 5.1, the aggregate timer checks its timer value to determine whether or not it has reached a preset aggregation period for the data receiving entity connected to the output port being monitored. If this is not the case, then processing proceeds to step 5.3, wherein the timer value is incremented, and then loops back around to step 5.1 wherein the check is performed again.

If the check performed at step 5.1 determines that the aggregate timer has reached the preset aggregation period then the aggregate timer moves to the state in step 5.5, and outputs a timer control signal to both the counter 314, and the message composer 316. After outputting the control signal then the timer resets the timer value at step 5.7, and returns to the checking step at step 5.1. Thus, in this way the aggregate timer acts to increment a timer value until the timer value reaches the aggregation period, whereupon a control signal is then output to the counter 314 and the message composer 316, the timer value reset, and the process repeated.

Figure 7:
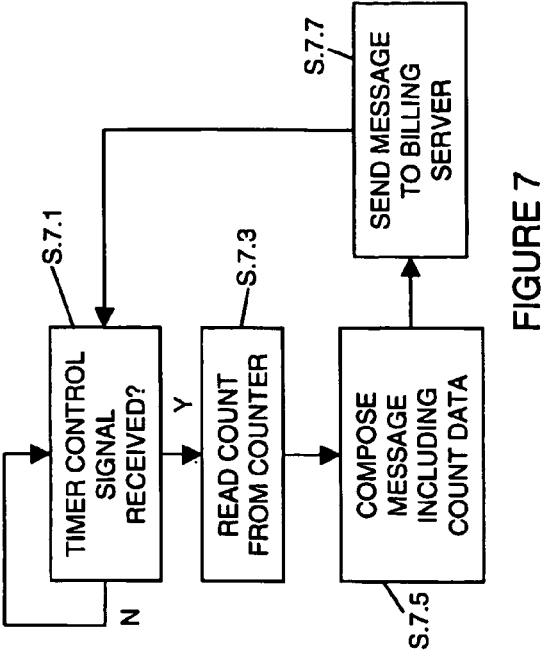
FIG. 7 is a flow diagram illustrating the operation of the message composer used in the router of FIG. 3.

FIG. 7 illustrates the steps performed by the message composer 316. The message composer 316 starts in the state 7.1 wherein it is checking as to whether or not a timer control signal is received. This is essentially a wait step, and is repeated until a timer control signal is received. Once a timer control signal has been received from the aggregate timer 318, then the counter unit 314 should have output its count value to the message composer 316, and hence at step 7.3 the message composer 316 reads the count from the counter unit. Next, at step 7.5 the message composer 316 composes a message including the count data, for example by packetising the count data into a suitable data message, and at step 7.7 sends the message including the count data to a billing server. Once the message is sent the message composer returns to the wait state 7.1.

As was explained previously, each of the units which make up the router of FIG. 3 may be implemented in software, and controlled by a software program such as the ECN count control program 322, stored on a data storage medium 320. Where this is the case, the ECN count control program 322 controls each of the units in accordance with the flow diagrams just described.

Moreover, it will be seen that each of the elements just described act in respect of data packets to be transmit from a single output port of the router. In order to facilitate the counting of ECN packets on every output port a respective set of the aforementioned units is provided for each output port. That is, respective ECN bit examiners 312, counters 314, message composers 316, and aggregate timers 318 to monitor each output port of the router may be provided.

Having described the operation of the routers used in the embodiments of the present invention, the system architecture and operation of any one of the billing servers 28, 30, or 32 will now be described with respect to FIGS. 8 and 9.

Figure 8:
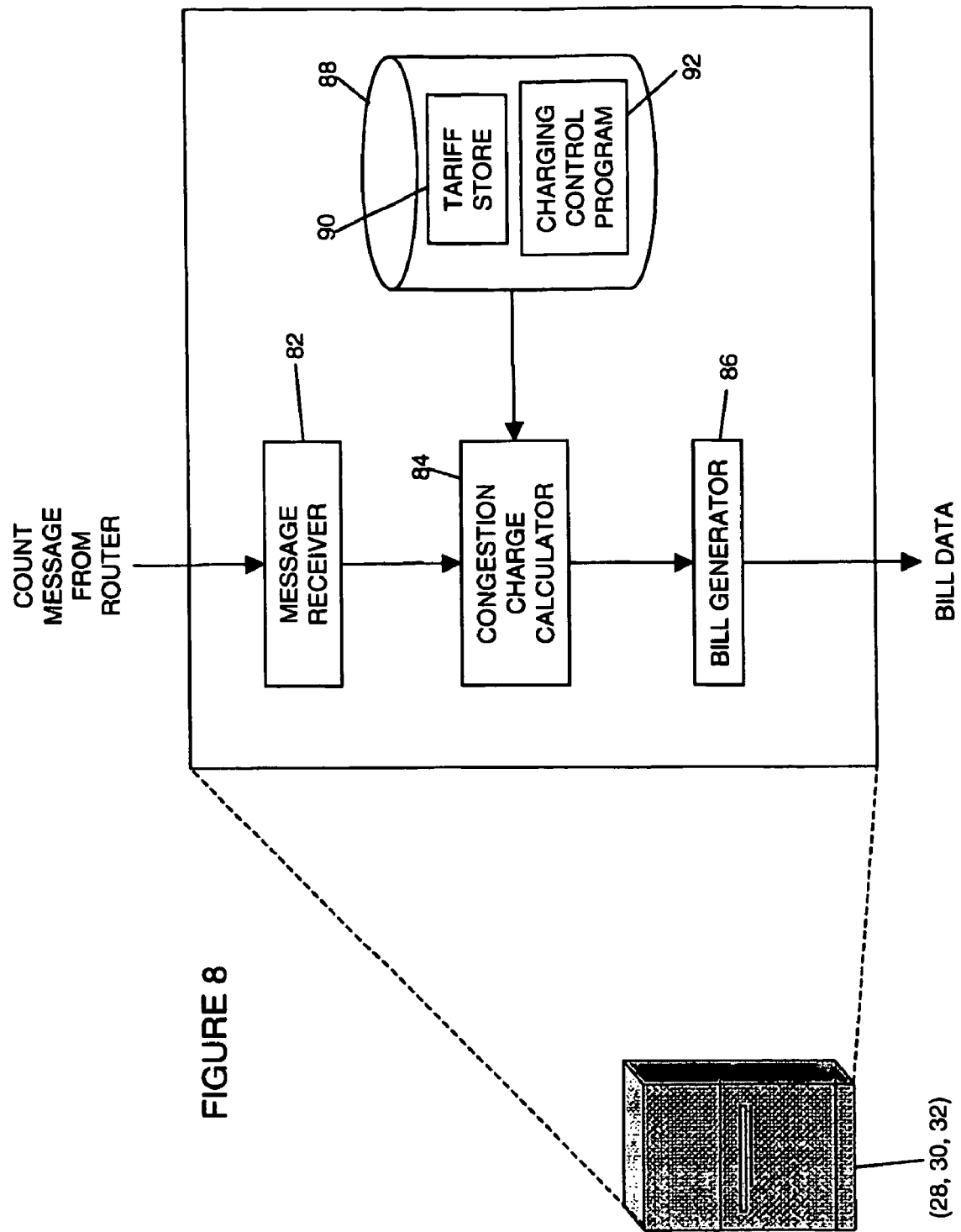
FIG. 8 is a block diagram of a billing server as used in the embodiments of FIGS. 1 and 2.

FIG. 8 illustrates the internal system architecture of a billing server provided by the embodiments of the invention. More particularly, the billing server comprises a message receiver unit 82 which is arranged to receive a count message from a router, and to depacketise the message to obtain the count data. The count data is then passed to a congestion charge calculator 84, which is arranged to access a tariff store 90 in a non-transitory data storage medium 88 (such as a hard disk, memory, or the like) so as to access an appropriate tariff function therefrom. The congestion charge calculator 84 then applies the received count data to the tariff function, to generate a congestion charge signal indicative of the congestion charge to be levied by the billing server, and this congestion charge signal is passed to the bill generator 86. The bill generator 86 uses the congestion charge signal to use produce bill data, specifying the format of a bill to be sent to the next data receiving entity (i.e. next domain, or end user). The bill data may be output to a third party unit or entity for conversion into an actual invoice or the like. Such an invoice may be transmitted electronically to the receiving party, or in a conventional manner such as by post.

Each of the message receiver unit 82, congestion charge calculator 84, and bill generator 86, may be implemented in software, and controlled by a charging control program 92 stored on the data storage device 88.

The tariff store 90 may store tariff data specifying a number of different tariff functions. Many suitable tariff functions will be known in the art, (such as, for example, bulk buying tariff functions where a different pro-rata rate is applied depending on the level of the count with a lower rate being applied for a higher count), or time based tariff functions which apply a different charging rate depending on the time of use. Many other such tariff functions employing combinations of different tariff factors will be apparent to those skilled in the art.

Figure 9:
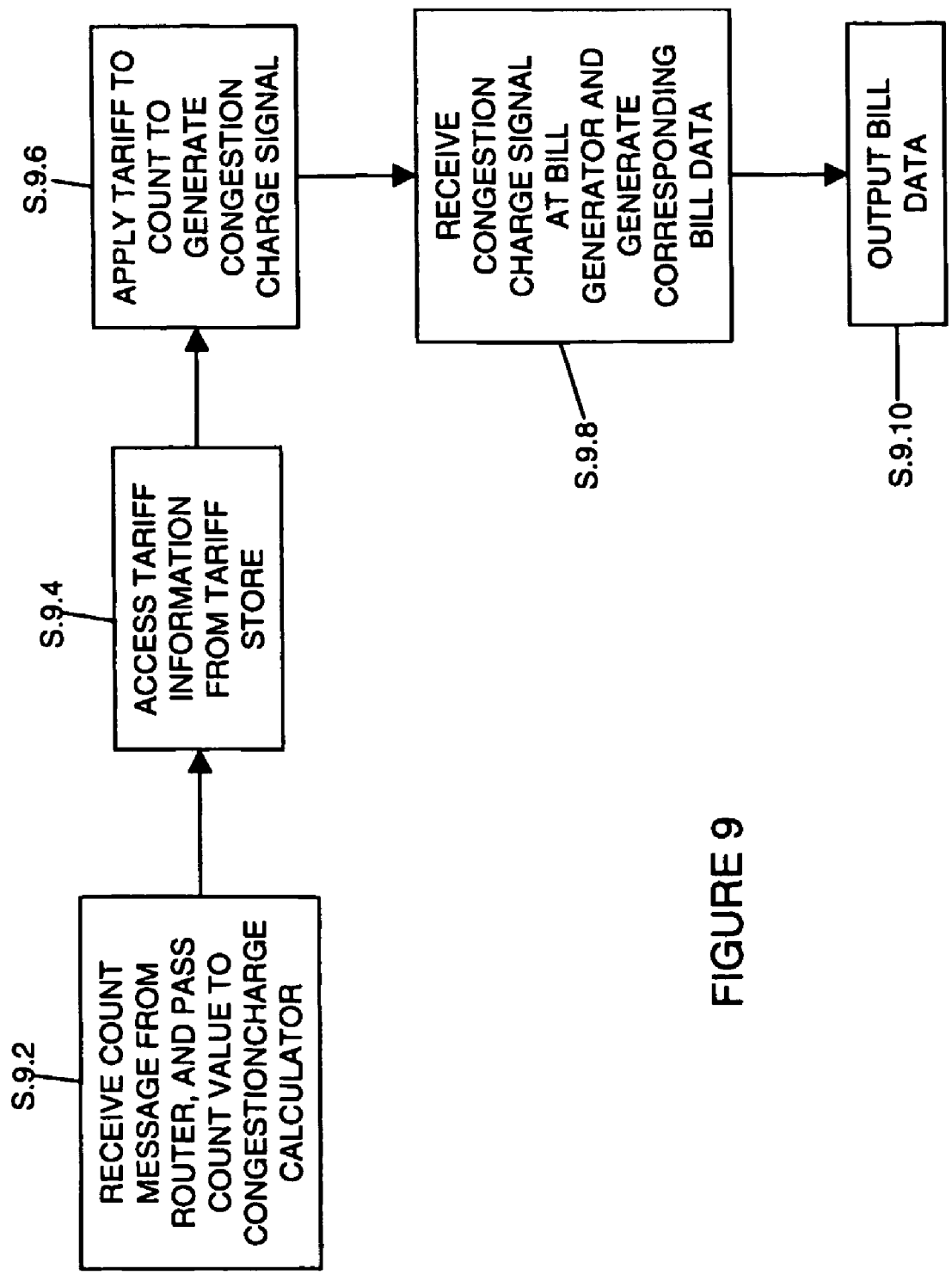
FIG. 9 is a flow diagram illustrating the operation of the billing server of FIG. 8 within the embodiments.

FIG. 9 illustrates the steps performed by the billing server 28, 30 or 32. Firstly, at step 9.2 the billing server acts to receive a count message from the router, to depacketise the count value from the message, and to pass the count value to the congestion charge calculator. Next, at step 9.4 the congestion charge calculator accesses the appropriate tariff information from the tariff store and at step 9.6 applies the tariff to the received count to generate the congestion charge signal. The congestion charge signal is then sent to the bill generator 86, which receives the congestion charge signal at step 9.8, and generates the corresponding bill data which is output at step 9.10. As mentioned previously, the bill data may be output to a third party entity for conversion into an actual electronic or physical bill, or alternatively to a connected peripheral such as a printer, display screen, or the like.

The embodiment of the invention thus described therefore provides for scaleable inter domain congestion charging, which allows congestion charges to ripple along the path of data traffic accumulating the charge from the sender to the receiver. As the counting of the congestion marks is performed on an aggregate cumulative basis rather than on a per flow basis, the technique is particularly scaleable thus reducing administrative overheads and improving technical efficiency.

Within the embodiments described the counting functions of the egress routers and the billing functions of the billing server 30 have been separate, but of course in further embodiments these functions may be integrated and performed by the same machine. In such embodiments the operation will be exactly the same as previously described, with the sole difference that there will be no need to packetise the count data into a message for transmission from the egress router to the billing server, as the count data will be capable of being passed directly from the counter unit to the congestion charge calculator unit, due to their being in the same machine.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method of operating a data packet network, wherein at least some of the data packets transported by the network contain control data indicative of whether the packet has experienced congestion, the method comprising:

a) routing data packets from the network towards a plurality of data packet receiving entities, said plurality of data packet receiving entities including one or more network domains;

b) counting the number of data packets routed towards the or each said respective network domain which contains control data indicating that the packet has experienced congestion; and c) in respect of the or each of said network domains generating a congestion charge signal indicating the respective congestion charges to be levied on the respective network domain for transport of the data packets routed thereto in dependence on the respective count for the respective network domain obtained from step b).

2. A method according to claim 1, wherein the generating step further comprises applying a tariff function to the or each respective count to produce the congestion charge signals.

3. A method according to claim 2, wherein the plurality of data packet receiving entities includes a plurality of network domains, and wherein different tariff functions are applied to at least some of the respective counts such that different congestion charges are levied pro rata on at least some of the network domains.

4. A method according to claim 1, and further comprising:

i) receiving data packets from one or more data transmitting entities, at least some of the received data packets containing control data indicating that the packet has experienced congestion;

ii) receiving respective congestion charge signals from the or each data transmitting entities indicating the respective congestion charges to be levied for receiving the received data packets therefrom.

5. A method according to claim 1, wherein the counting step is performed for the or each respective network domain over a respective aggregation period, and the generating step further acts to generate the respective congestion charge signal for a particular network domain once per aggregation period.

6. A method according to claim 1, wherein the plurality of data packet receiving entities includes more than one network domain.

7. A method of operating a data packet network, wherein at least some of the data packets transported by the network contain control data indicative of whether the packet has experienced congestion, the method comprising:

a) routing data packets from the network towards a plurality of data packet receiving entities, said plurality of data packet receiving entities including one or more network domains;

b) in respect of the or each of said network domains, counting the number of data packets routed towards the respective network domain which contains control data indicating that the packet has experienced congestion;

c) in respect of the or each of said network domains, generating a count signal indicating the respective count for the respective network domain obtained from step b); and d) transmitting the one or more count signals to a billing server.

8. A method according to claim 7, and further comprising:

i) receiving data packets from one or more data transmitting entities, at least some of the received data packets containing control data indicating that the packet has experienced congestion.

9. A method according to claim 7, wherein the counting step is performed for the or each respective network domain over a respective aggregation period, and the count signals are generated and transmitted to the billing server once per respective aggregation period.

10. A method of operating a billing server, comprising:
   a) receiving count signals, each count signal indicating a respective count of the number of data packets routed to a respective one of a plurality of network domains by a data packet network which contains control data indicating that the packet has experienced congestion; and
   b) generating congestion charge signals indicating respective congestion charges to be levied on the network domains in dependence on the received respective count signals.

11. A method according to claim 10, wherein the generating step further comprises applying a tariff function to each respective count to produce the congestion charge signals.

12. A method according to claim 11, wherein different tariff functions are applied to at least some of the respective counts such that different congestion charges pro rata are levied on at least some of the network domains.

13. A method according to claim 10, and further comprising:
   i) receiving respective congestion charge signals from one or more data transmitting entities indicating the respective congestion charges to be levied on the network for receiving data packets therefrom.

14. A method according to claim 10, wherein the counting signals are received once per respective aggregation period, and the generating step further acts to generate the respective congestion charge signal for a particular network domain once per aggregation period.

15. A non-transitory computer program storage medium containing a computer program or suite of programs arranged such that when executed by a computer or collectively by a plurality of computers it/they cause the computer or computers to perform the method of claim 1.

16. A data packet network, for transporting data packets containing control data indicative of whether the packet has experienced congestion, the network comprising:
   i) at least one router, arranged in use to:
      a) route data packets from the network towards a plurality of data packet receiving entities, said plurality of data packet receiving entities including one or more network domains; and
      b) count the number of data packets routed towards the or each network domain which contains control data indicating that the packet has experienced congestion; and
   ii) at least one data processor configured in use to generate one or more respective congestion charge signals indicating the respective congestion charges to be levied on the network domains for transport of the data packets routed thereto in dependence on the respective count for the or each network domain obtained by the or each router.

17. A network according to claim 16, wherein the at least one data processor is further arranged to apply a tariff function to each respective count to produce the congestion charge signals.

18. A network according to claim 17, wherein the plurality of data packet receiving entities includes a plurality of network domains, and wherein different tariff functions are applied to at least some of the respective counts such that different congestion charges are levied pro rata on at least some of the network domains.

19. A network according to claim 16, and further comprising:
   i) at least one router configured for receiving data packets from one or more data transmitting entities, at least some of the received data packets containing control data indicating that the packet has experienced congestion; and
   ii) at least one data processor configured for receiving respective congestion charge signals from the or each data transmitting entities indicating the respective congestion charges to be levied for receiving the received data packets therefrom.

20. A network according to claim 16, wherein the or each router is further arranged to perform the counting step for the or each respective network domain over a respective aggregation period, and the at least one data processor further acts to generate the respective congestion charge signal for a particular network domain once per aggregation period.

21. A network according to claim 16, wherein the plurality of data packet receiving entities includes more than one network domain.

22. A router for a data packet network, wherein at least some of the data packets transported by the network contain control data indicative of whether the packet has experienced congestion, the router comprising:
   a) at least one data processor configured for routing data packets from the network towards a plurality of data packet receiving entities, said plurality of data packet receiving entities including one or more network domains;
   b) at least one data processor configured for counting the number of data packets routed towards the or each respective network domain which contains control data indicating that the packet has experienced congestion;
   c) at least one data processor configured to generate one or more count signals indicating the respective count for the or each network domain obtained from b); and
   d) at least one data transmitter configured for transmitting the one or more count signals to a billing server.

23. A router according to claim 22, wherein said counting operates over a respective aggregation period for the or each network domain, and the count signals are generated and transmitted to the billing server once per respective aggregation period.

24. A billing server, comprising:
   a) at least one data receiver configured for receiving count signals, each count signal indicating a respective count of the number of data packets routed to a respective one of a plurality of network domains by a data packet network which contains control data indicating that the packet has experienced congestion; and
   b) at least one data processor configured for generating congestion charge signals indicating respective congestion charges to be levied on the network domains in dependence on the received respective count signals.

25. A server according to claim 24, wherein the congestion charge generation applies a tariff function to the or each respective count to produce the congestion charge signals.

26. A server according to claim 25, wherein different tariff functions are applied to at least some of the respective counts such that different congestion charges pro rata are levied on at least some of the network domains.

27. A server according to claim 24, and further comprising:
   i) at least one data receiver configured for receiving respective congestion charge signals from one or more data transmitting entities indicating the respective congestion charges to be levied on the network for receiving data packets therefrom.

28. A server according to claim 24, wherein the counting signals are received once per respective aggregation period, and generation of the congestion charge generates the respective congestion charge signal for a particular network domain once per aggregation period.

* * * * *